(12) United States Patent
Park et al.

(10) Patent No.: US 7,961,038 B2
(45) Date of Patent: Jun. 14, 2011

(54) DIGITAL PROPORTIONAL INTEGRAL LOOP FILTER

(75) Inventors: Mi Jeong Park, Gongju (KR); Byung Hun Min, Gunsan (KR); Ja Yol Lee, Daejeon (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 6 days.

(21) Appl. No.: 12/631,637

(22) Filed: Dec. 4, 2009

(65) Prior Publication Data

US 2010/0145482 A1  Jun. 10, 2010

(30) Foreign Application Priority Data

Dec. 8, 2008  (KR) .................. 10-2008-0124303
Jul. 3, 2009  (KR) .................. 10-2009-0060619

(51) Int. Cl.
*H03B 1/00* (2006.01)
(52) U.S. Cl. ..................................... 327/552
(58) Field of Classification Search ........... 327/551–553
See application file for complete search history.

(56) References Cited

U.S. PATENT DOCUMENTS

| | | | |
|---|---|---|---|
| 6,851,493 B2 | 2/2005 | Staszewski et al. | |
| 7,157,954 B2* | 1/2007 | Mason | 327/311 |
| 7,339,420 B2* | 3/2008 | Maeda | 327/554 |
| 7,589,575 B2* | 9/2009 | Boerstler et al. | 327/156 |
| 7,649,408 B2* | 1/2010 | Liu et al. | 327/558 |
| 2006/0290435 A1 | 12/2006 | Staszewski et al. | |

OTHER PUBLICATIONS

Mike Keaveney et al., "A 10µs Fast Switching PLL Synthesizer for a GSM/EDGE Base-Station," ISSCC 2004, Session 10, Cellular Systems and Building Blocks /10.6, Feb. 17, 2004.
Ioannis L. Syllaios et al., "On the Reconfigurability of All-Digital Phase-Locked Loops for Software Defined Radios," The 18th Annual IEEE International Symposium on Personal, Indoor and Mobile Radio Communication (PIMRC'07), Sep. 2007.

* cited by examiner

*Primary Examiner* — Hai L Nguyen

(57) ABSTRACT

A digital proportional integral loop filter is provided. A first proportional amplification unit multiplies a phase error value by a first proportional loop gain, and a first integral amplification unit multiplies a phase error accumulation value by a first integral loop gain. A second proportional amplification unit multiplies the phase error value by a second proportional loop gain, and a second integral amplification unit multiplies the phase error accumulation value by a second integral loop gain. A first offset value generation unit generates a first offset value by subtracting the second proportional loop gain from the first proportional loop gain and multiplying a resulting value by a phase error average value, and a second offset value generation unit generates a second offset value by subtracting the second integral loop gain from the first integral loop gain and multiplying a resulting value by a phase error accumulation average value.

8 Claims, 4 Drawing Sheets

DIGITAL PROPORTIONAL INTEGRAL LOOP FILTER

CROSS-REFERENCE TO RELATED APPLICATIONS

This application claims the priorities of Korean Patent Application Nos. 10-2008-0124303 filed on Dec. 8, 2008, and 10-2009-0060619 filed on Jul. 3, 2009, in the Korean Intellectual Property Office, the disclosures of which are incorporated herein by reference.

BACKGROUND OF THE INVENTION

1. Field of the Invention

The present invention relates to a digital proportional integral loop filter for fast settling time, and more particularly, to a digital proportional integral loop filter capable of changing a loop filter gain through one-time switching to thereby change a loop filter coefficient even with a great change in loop filter gain by generating offsets using a phase error average value and a phase error accumulation average value, and capable of locking to a single desired frequency at a time to thereby reduce settling time.

2. Description of the Related Art

A conventional analog phase locked loop (PLL) including a phase/frequency detector, a charge pump, and an RC loop filter has been replaced with an all-digital PLL (ADPLL) including a time-to-digital converter and a simple digital loop filter. This is because signal processing can be performed with a digital circuit capable of avoiding dependency on a fine voltage resolution of an analog circuit. A new technology for an ADPLL digital loop filter has been proposed which has rapid frequency acquisition time while maintaining superior phase noise characteristics and spurious performance by applying a digital signal processing scheme to a loop filter.

FIG. 1 illustrates a related art proportional loop filter 100 using a gear-shift scheme. The proportional loop filter 100 using the gear-shift scheme includes bit shifters 120 and 121, adders 140 and 143, and a multiplexer 150. The bit shifters 120 and 121 acts as a multiplier and a divider. The multiplexer 150 outputs a value 130 of $\alpha_1 \cdot \phi_E[k]$ when a tracking mode control signal is 0, and outputs the sum of a value 131 of $\alpha_2 \cdot \phi_E[k]$ and a value 142 of $\Delta NTW$ when the tracking mode control signal is 1.

An output of a phase detector 101 is inputted to the proportional loop filter 100. A PLL loop gain value must be large in order to quickly reduce a settling time of an ADPLL, and must be small in order to obtain superior phase noise characteristics. To meet both of the opposite characteristics, a gear-shift scheme is used.

The case wherein the tracking mode control signal is 0 means that the acquisition of a fast settling time is desirable. In this case, the value $\alpha_1$ is selected so that a bandwidth of the ADPLL is widened, and the value 130 of $\alpha_1 \cdot \phi_E[k]$ is outputted as the output of the loop filter. The case wherein the tracking mode control signal is 1 means that superior phase noise characteristic is desirable. In this case, the value $\alpha_2$ ($<\alpha_1$) is selected so that the loop bandwidth is narrowed to reduce noise, and the value 131 of $\alpha_2 \cdot \phi_E[k]$ is outputted.

However, if the output of the loop filter abruptly changes from $\alpha_1 \cdot \phi_E[k]$ as the value 130 to $\alpha_2 \cdot \phi_E[k]$ as the value 131, the frequency locking of the ADPLL may be unlocked.

$$\alpha_1 \cdot \phi_E[k](130) = \alpha_2 \cdot \phi_E[k](131) + \Delta NTW \quad (1)$$

If the offset value 142 of $\Delta NTW$ is added as expressed in Equation (1), the phase error value is maintained at the same value as before the change, even though the loop filter gain is changed. Thus, the frequency locking of the ADPLL is not unlocked, and noise is reduced because the loop bandwidth is narrowed.

$$\Delta NTW(142) = (\alpha_1 - \alpha_2) \cdot \phi_E[k] \quad (2)$$

The offset value may be calculated from Equation (2) under the conditions of Equation (1).

Since the hardware sizes of the multiplier and the divider are large, the bit shifters 120 and 121 may be used if a corresponding to the square of 2 is used. Thus, the size and complexity of the required hardware are reduced.

The output of the multiplexer 150 is the output 151 of the loop filter 100, and is inputted to a digitally controlled oscillator (DCO) 160. In the loop filter using the gear-shift scheme, noise may be further added at the moment when the gear shift is switched. When the difference between $\alpha_1$ and $\alpha_2$ is great, the gear shift may not find the frequency corresponding to $\alpha_2$ at a time, and a settling time for a desired frequency value is required. Therefore, in order to reduce the settling time and improve the phase noise characteristic, the amount of shift switching must be increased by changing the loop filter gain value in sequence, for example, $2^{-2} \rightarrow 2^{-4} \rightarrow 2^{-6}$. Furthermore, there may be a problem in the stability of the ADPLL because the gear shift of the loop filter gain is applied only to the proportional loop filter structure.

SUMMARY OF THE INVENTION

An aspect of the present invention provides a digital proportional integral loop filter capable of outputting a single desired frequency through one-time gain change by generating offset values using a phase error average value and a phase error accumulation average value even with a great change in loop filter gain, and capable of locking to the single desired frequency at a time to thereby reduce settling time.

According to an aspect of the present invention, there is provided a digital proportional integral loop filter including: a first proportional amplification unit multiplying a phase error value by a first proportional loop gain; a first integral amplification unit multiplying a phase error accumulation value by a first integral loop gain; a second proportional amplification unit multiplying the phase error value by a second proportional loop gain; a second integral amplification unit multiplying the phase error accumulation value by a second integral loop gain; a first offset value generation unit generating a first offset value which is calculated by subtracting the second proportional loop gain from the first proportional loop gain and multiplying a resulting value by a phase error average value; and a second offset value generation unit generating a second offset value which is calculated by subtracting the second integral loop gain from the first integral loop gain and multiplying a resulting value by a phase error accumulation average value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
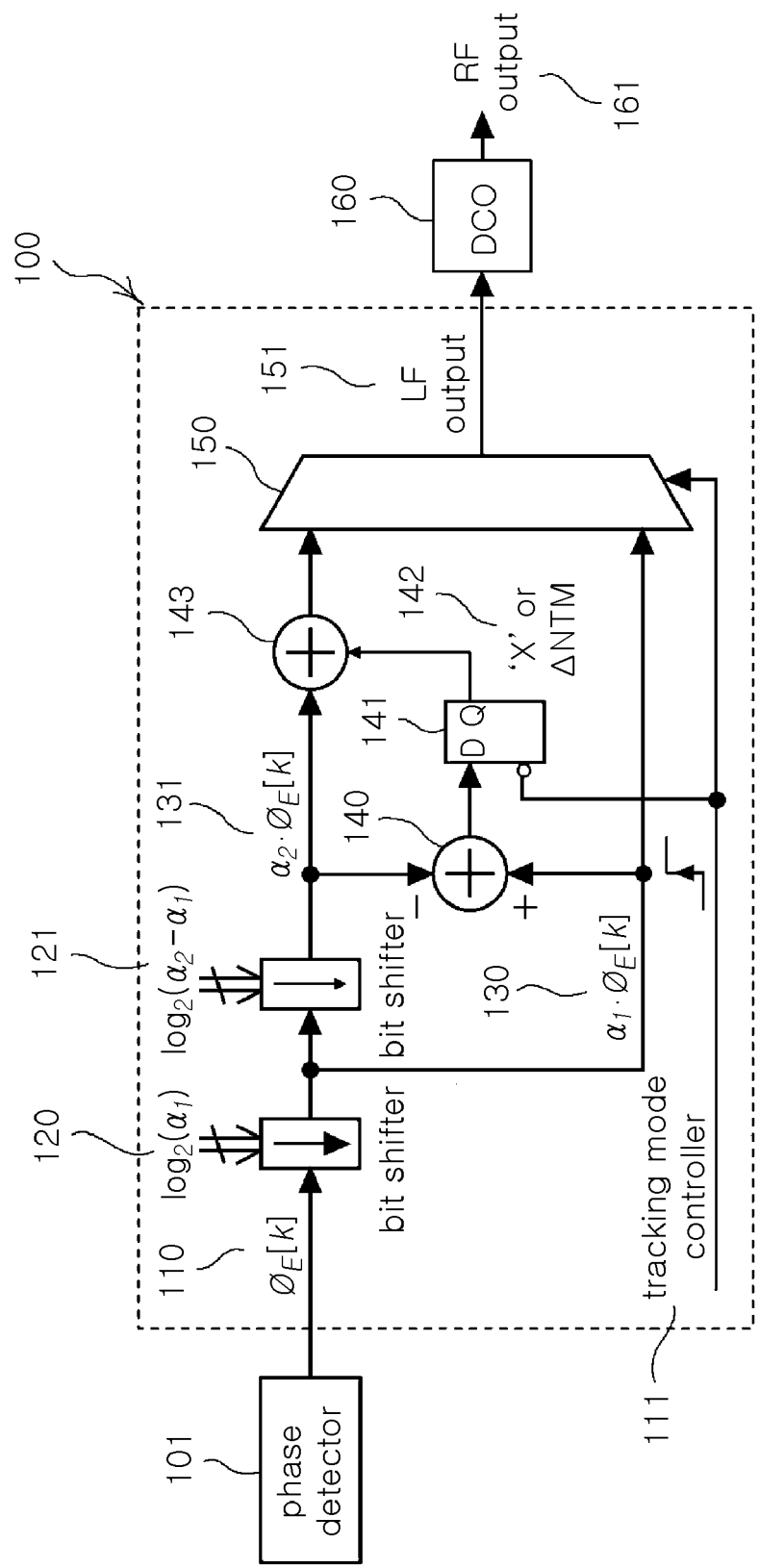
FIG. 1 illustrates a structure of a type-I loop filter using a related art gear-shift scheme.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

In addition, in a whole disclosure, when one element is referred to as being "connected" to another element, it should be understood that the former can be "directly connected" to the latter, or "electrically connected" to the latter via an intervening element. Furthermore, "including" an element signifies further including, not excluding, another element if there is no specific reference to the contrary.

Figure 2:
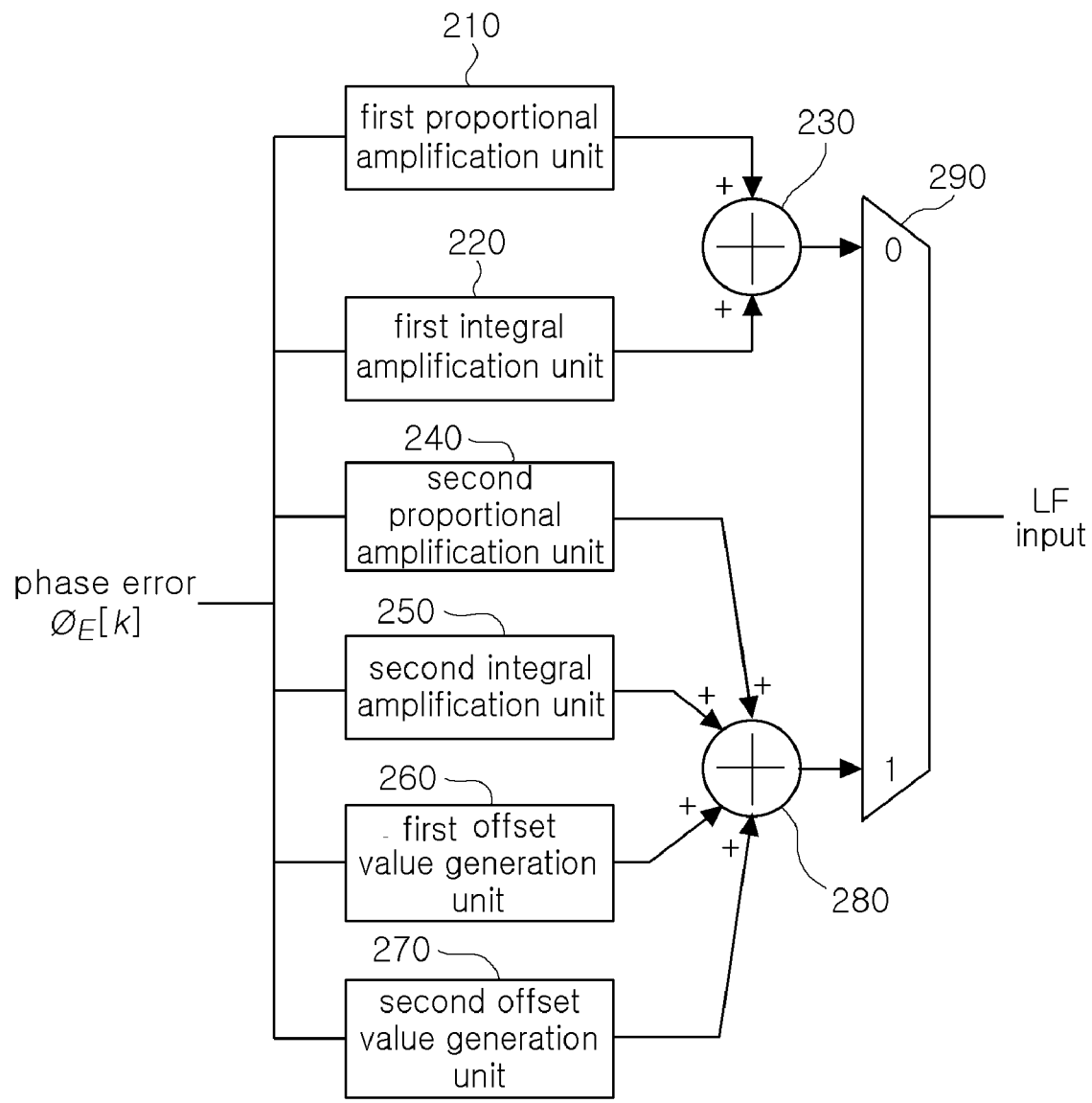
FIG. 2 illustrates a structure of a digital proportional integral loop filter according to an embodiment of the present invention.

FIG. 2 illustrates a structure of a digital proportional integral loop filter according to an embodiment of the present invention.

Referring to FIG. 2, the digital proportional integral loop filter according to the embodiment of the present invention includes a first proportional amplification unit 210, a first integral amplification unit 220, a first adder 230, a second proportional amplification unit 240, a second integral amplification unit 250, a first offset value generation unit 260, a second offset value generation unit 270, a second adder 280, and a multiplexer 290.

The first proportional amplification unit 210 and the second proportional amplification unit 240 multiply phase errors by proportional loop gains.

The first integral amplification unit 220 and the second integral amplification unit 250 accumulate phase errors to generate a phase error accumulation value, and multiply the phase error accumulation value by integral loop gains.

The first offset value generation unit 260 generates a phase error average value by averaging the phase errors during a certain period where an average enable signal is activated, subtracts a second proportional loop gain from a first proportional loop gain, and multiplies the subtraction result value by the phase error average value. The multiplication result value is outputted as a first offset value.

The second offset value generation unit 270 generates a phase error accumulation average value by averaging the phase error accumulation values during a certain period where the average enable signal is activated, subtracts a second integral loop gain from a first integral loop gain, and multiplies the subtraction result value by the phase error accumulation average value. The multiplication result value is outputted as a second offset value.

The first adder 230 adds the output of the first proportional amplification unit 210 and the output of the first integral amplification unit 220, and outputs the addition result value to the multiplexer 290.

The second adder 280 adds the output of the second proportional amplification unit 240, the output of the second integral amplification unit 250, the output of the first offset value generation unit 260, and the output of the second offset value generation unit 270, and outputs the addition result value to the multiplexer 290.

The multiplexer 290 outputs the output of the first adder 230 when a gain change enable control signal is 0, and outputs the output of the second adder 280 when the gain change enable control signal is 1.

Figure 3:
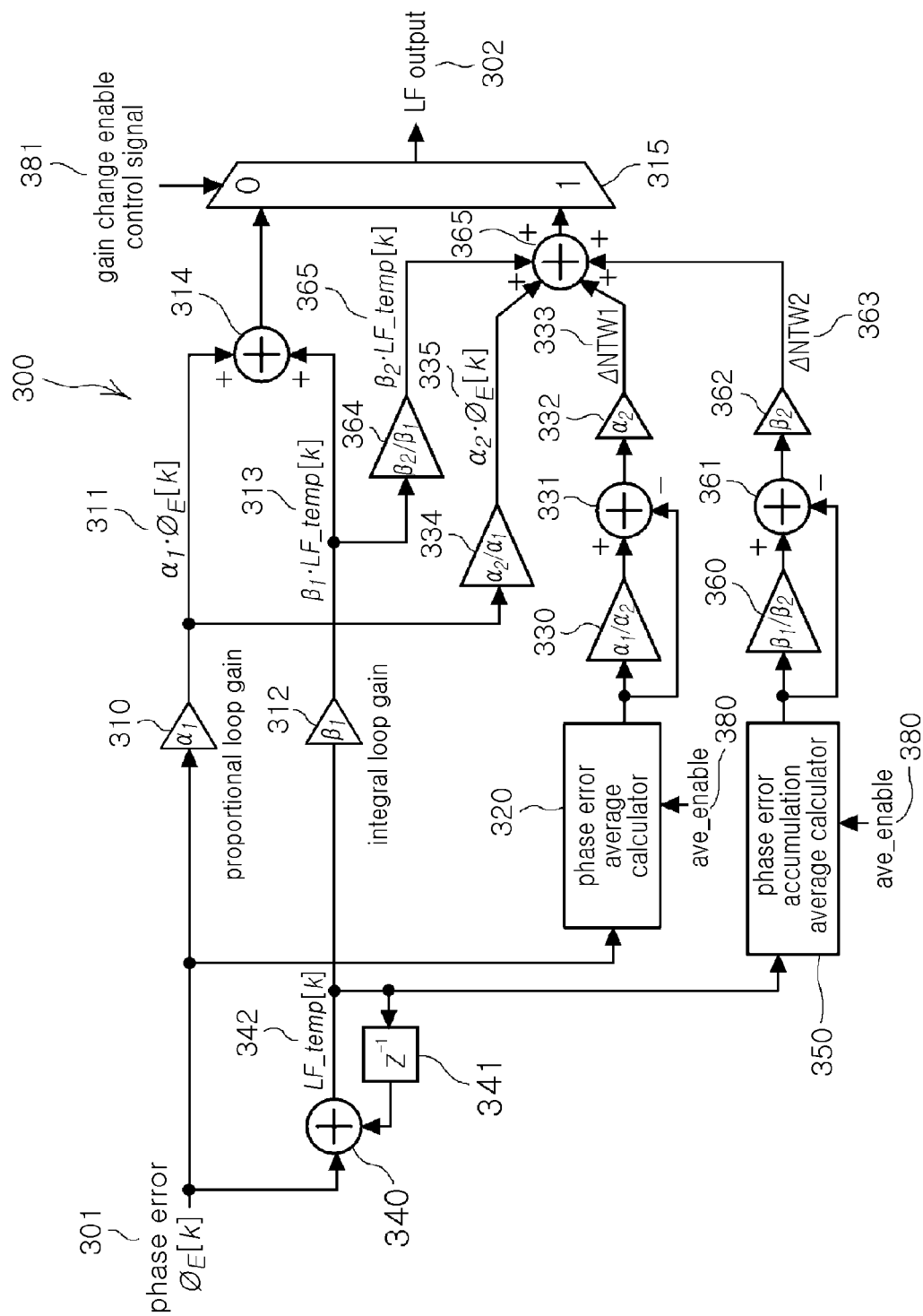
FIG. 3 illustrates a detailed structure of the digital proportional integral loop filter of FIG. 2.

FIG. 3 illustrates a detailed structure of the digital proportional integral loop filter of FIG. 2.

In FIG. 3, $\alpha_1$, $\alpha_2$, $\beta_1$, $\beta_2$, $\Delta NTW1$, and $\Delta NTW2$ represent the first proportional loop gain, the second proportional loop gain, the first integral loop gain, the second integral loop gain, the first offset value, and the second offset value, respectively.

Referring to FIGS. 2 and 3, the digital proportional integral loop filter according to the embodiment of the present invention receives a phase error 301 of $\phi_E[k]$ and includes a phase error accumulation generator 432 with an adder 340 and a feedback loop 341. Here, the phase error accumulation generator 432 may be shared by the second integral amplification unit 250, the first offset value generation unit 260, and the second offset value generation unit 270.

The first proportional amplification unit 210 may include an amplifier 310. Since the phase error 301 of $\phi_E[k]$ is multiplied by the first proportional loop gain $\alpha_1$, $\alpha_1 \cdot \phi_E[k]$ may be the output of the first proportional amplification unit 210.

The first integral amplification unit 220 may include the phase error accumulation generator 342 and an amplifier 312. The phase error accumulation generator 342 receives the phase error value $\phi_E[k]$ to generate the phase error accumulation value LF_temp[k]. Since the phase error accumulation value LF_temp[k] is multiplied by the first integral loop gain $\beta_1$, $\beta_1 \cdot$LF_temp[k] may be the output of the first integral amplification unit 220.

An adder 314 adds the output of the first proportional amplification unit 210 and the output of the first integral amplification unit 220 and outputs the addition result value to the multiplexer 315. When the gain change enable signal is 0 (signal state before gain change), the output of the loop filter may be given as follows:

$$LF\_output[k] = \alpha_1 \cdot \phi_E[k] + \beta_1 \cdot LF\_temp[k]$$

The second proportional amplification unit 240 may include two amplifiers 310 and 334. Since $\alpha_1$ and $\alpha_2/\alpha_1$ are sequentially multiplied by the phase error $\phi_E[k]$, $\alpha_2 \cdot \phi_E[k]$ may be the output of the second proportional amplification unit 240.

The second integral amplification unit 250 may include the phase error accumulation generator 342 and two amplifiers 312 and 364. The phase error accumulation generator 342 receives the phase error value $\phi_E[k]$ to generate the phase error accumulation value LF_temp[k]. Since $\beta_1$ and $\beta_2/\beta_1$ are sequentially multiplied by the phase error accumulation value LF_temp[k], $\beta_2 \cdot$LF_temp[k] may be the output of the second integral amplification unit 250.

The first offset value generation unit 260 may include a phase error average calculator 320, two amplifiers 330 and 332, and an adder 331. The first offset values $\Delta NTW1$, when the phase error average calculator 320 is disabled and enabled, are as follows:

$$\Delta NTW1 = (\alpha_1 - \alpha_2)\phi_E[k]$$

$$\Delta NTW1_{ave} = (\alpha_1 - \alpha_2)\phi_{E\_ave}[k]$$

The second offset value generation unit 270 may include a phase error accumulation average calculator 350, two amplifiers 360 and 362, and an adder 361. The second offset values ΔNTW2, when the phase error accumulation average calculator 350 is disabled and enabled, are as follows:

$$\Delta NTW2=(\beta_1-\beta_2)LF\_temp[k]$$

$$\Delta NTW2_{ave}=(\beta_1-\beta_2)LF\_temp[k]$$

At this point, the phase error average value $\phi_{E\_ave}[k]$ is a value obtained by accumulating the phase error value $\phi_E[k]$ during a period where the average enable signal is 1, and dividing the resulting value by the number of accumulation. The phase error accumulation average value $LF\_temp_{ave}[k]$ is a value obtained by accumulating the phase error accumulation value $LF\_temp[k]$ during a period where the average enable signal is 1, and dividing the resulting value by the number of accumulation.

An adder 365 adds the output of the second proportional amplification unit 240, the output of the second integral amplification unit 250, the output of the first offset value generation unit 260, and the output of the second offset value generation unit 270, and outputs the addition result value to the multiplexer 315. In a case where the gain change enable signal is 1 (state after the gain change), the output of the loop filter, when the phase error average calculator 320 and the phase error accumulation average calculator 350 are disabled, is as follows:

$$LF\_output[k]=\alpha_2\cdot\phi_E[k]+\Delta NTW1+\beta_2\cdot LF\_temp[k]+\Delta NTW2_{ave}$$

Also, in a case where the gain change enable signal is 1 (state after the gain change), the output of the loop filter, when the phase error average calculator 320 and the phase error accumulation average calculator 350 are enabled, is as follows:

$$LF\_output[k]=\alpha_2\cdot\phi_E[k]+\Delta NTW1_{ave}+\beta_2\cdot LF\_temp[k]+\Delta NTW2_{ave}$$

The operation of the digital proportional integral loop filter in accordance with the embodiment of the present invention will be described below, while comparing the outputs of the loop filter before and after the gain change.

When the gain change enable signal is 0 (signal state before loop filter gain change), the output of the loop filter is as follows:

$$LF\_output[k]=\alpha_1\cdot\phi_E[k]+\beta_1\cdot LF\_temp[k]$$

When the phase error average calculator 320 and the phase error accumulation average calculator 350 are disabled and the gain change enable signal is 1 (after loop filter gain change), the output of the loop filter is as follows:

$$LF\_output[k]=\alpha_2\cdot\phi_E[k]+\Delta NTW1+\beta_2\cdot LF\_temp[k]+\Delta NTW2$$

Also, two offset values are as follows:

$$\Delta NTW1=(\alpha_1-\alpha_2)\phi_E[k]$$

$$\Delta NTW2=(\beta_1-\beta_2)LF\_temp[k]$$

Therefore, since the outputs of the loop filter before and after the gain change are identical to each other, the frequency locking is not unlocked during the gain change. Furthermore, the use of the proportional integral loop filter may increase the stability of ADPLL, compared with the use of the proportional loop filter.

Another feature of the digital proportional integral loop filter according to the embodiment of the present invention is that, unlike the existing gear shift method, the phase error average value $\phi_{E\_ave}[k]$ instead of the phase error $\phi_E(k)$ is used as the input of the gear shift in the proportional amplification unit. Moreover, the phase error accumulation average value $LF\_temp_{ave}[k]$ instead of the phase error accumulation value $LF\_temp[k]$ is used as the input of the gear shift in the integral amplification unit.

Therefore, two offset values using such average values are as follows:

$$\Delta NTW1_{ave}=(\alpha_1-\alpha_2)\phi_{E\_ave}[k]$$

$$\Delta NTW2_{ave}=(\beta_1-\beta_2)LF\_temp_{ave}[k]$$

In this case, the output of the loop filter after the gain change is as follows:

$$LF\_output[k]=\alpha_2\cdot\phi_E[k]+\Delta NTW1_{ave}+\beta_2\cdot LF\_temp[k]+\Delta NTW2_{ave}$$

Since the offset values are generated using the average values, the desired frequency may be outputted through one-time gain change, even though the loop filter gain value is greatly changed.

Figure 4:
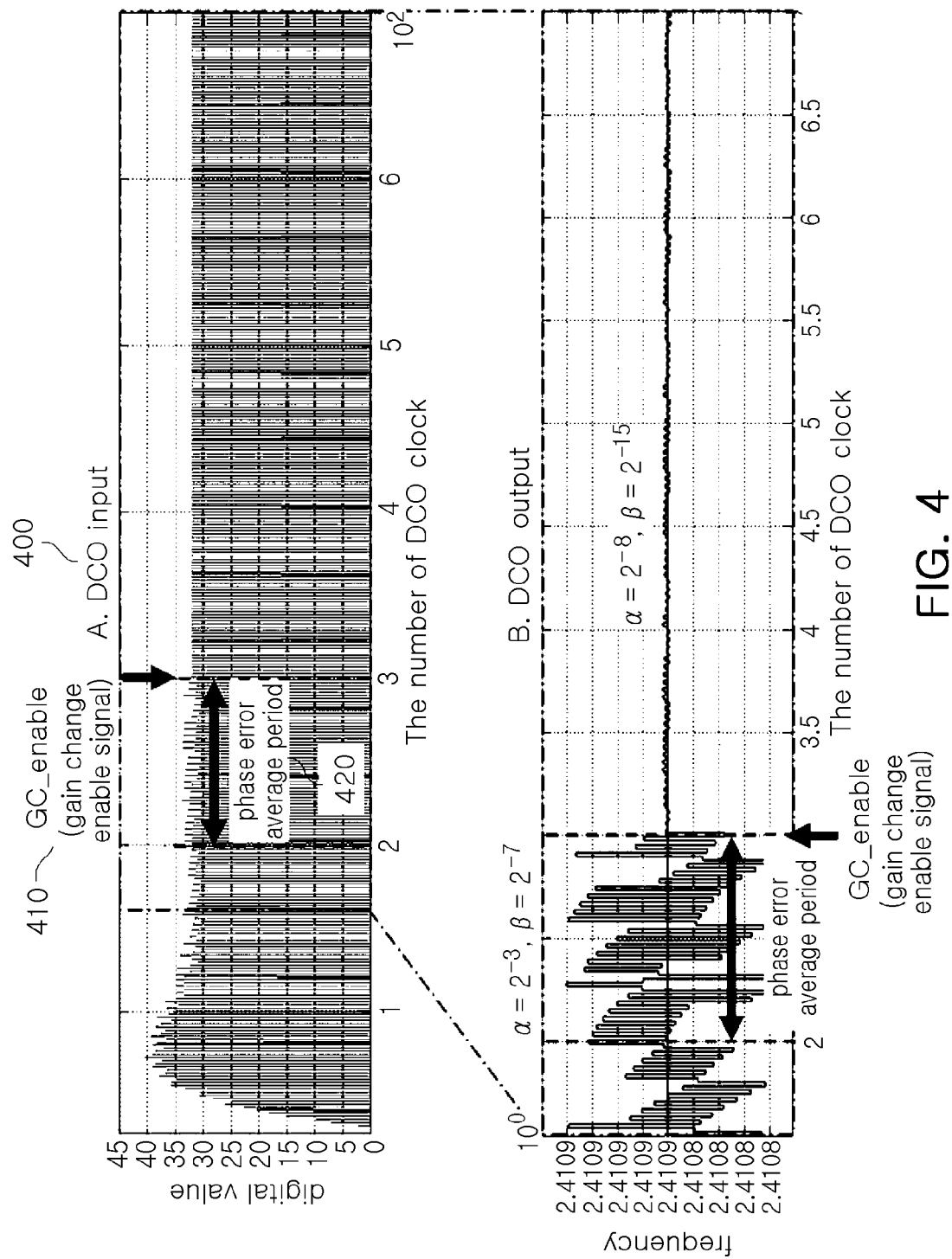
FIG. 4 is a graph of simulation results showing an output frequency change of an ADPLL to which the digital proportional integral loop filter is added.

FIG. 4 is a graph of simulation results showing the output frequency change of the ADPLL with the digital proportional integral loop filter according to the embodiment of the present invention.

During a phase error average period 420 before the gain change of the loop filter, the phase error average calculator and the phase error accumulation average calculator within the first and second offset value generation units calculate the phase error average value $\phi_{E\_ave}[k]$ and the phase error accumulation average value $LF\_temp_{ave}[k]$, respectively.

At the moment the gain change enable control signal becomes 1, the loop filter gain values change from $\alpha_1=2^{-3}$ and $\beta_1=2^{-7}$ to $\alpha_2=2^{-8}$ and $\beta_2=2^{-15}$.

From graph A of FIG. 4 showing a DCO input signal, it can be seen that a DCO input close to a desired frequency is generated at a time after the gain change of the loop filter.

Furthermore, from graph B of FIG. 4 showing a DCO output signal, it can be seen that a frequency corresponding to a desired frequency range is generated at a time after the gain change of the loop filter.

As set forth above, the gear shift method according to the related art has a problem in that the number of the gear shift switching may increase when the loop filter gain value is greatly changed. However, the digital proportional integral loop filter in accordance with the embodiment of the present invention may solve the problem of the related art by containing the phase error average value and the phase error accumulation average value during the offset value generation. Furthermore, the settling time may be reduced because the locking to a desired frequency is achieved at a time, even though the loop filter gain value is greatly changed. Moreover, since the proportional integral loop filter is used, the stability of the ADPLL may increase.

While the present invention has been shown and described in connection with the exemplary embodiments, it will be apparent to those skilled in the art that modifications and variations can be made without departing from the spirit and scope of the invention as defined by the appended claims.

What is claimed is:
1. A digital proportional integral loop filter comprising:
   a first proportional amplification unit multiplying a phase error value by a first proportional loop gain;
   a first integral amplification unit multiplying a phase error accumulation value by a first integral loop gain;
   a second proportional amplification unit multiplying the phase error value by a second proportional loop gain;
   a second integral amplification unit multiplying the phase error accumulation value by a second integral loop gain;

a first offset value generation unit generating a first offset value which is calculated by subtracting the second proportional loop gain from the first proportional loop gain and multiplying a resulting value by a phase error average value; and a second offset value generation unit generating a second offset value which is calculated by subtracting the second integral loop gain from the first integral loop gain and multiplying a resulting value by a phase error accumulation average value.

2. The digital proportional integral loop filter of claim 1, wherein the digital proportional integral loop filter further comprises:

a first adder adding an output of the first proportional amplification unit and an output of the first integral amplification unit;

a second adder adding an output of the second proportional amplification unit, an output of the second integral amplification unit, an output of the first offset value generation unit, and an output of the second offset value generation unit; and a multiplexer outputting an output of the first adder or an output of the second adder.

3. The digital proportional integral loop filter of claim 2, wherein the first offset value generation unit comprises:

a phase error average calculator calculating the phase error average value within a period where an average enable control signal is activated;

a first amplifier multiplying an output of the phase error average calculator by (the first proportional loop gain/ the second proportional loop gain);

a third adder outputting a value which is calculated by subtracting the output of the phase error average calculator from an output of the first amplifier; and a second amplifier multiplying an output of the third adder by the second proportional loop gain.

4. The digital proportional integral loop filter of claim 2, wherein the second offset value generation unit comprises:

a phase error accumulation average calculator calculating the phase error accumulation average value within a period where an average enable control signal is activated;

a third amplifier multiplying an output of the phase error accumulation average calculator by (the first integral loop gain/the second integral loop gain);

a fourth adder outputting a value which is calculated by subtracting the output of the phase error accumulation average calculator from an output of the third amplifier; and a fourth amplifier multiplying an output of the fourth adder by the second integral loop gain.

5. The digital proportional integral loop filter of claim 2, wherein the multiplexer outputs the output of the first adder when a gain change enable control signal is a state before a gain change, and outputs the output of the second adder when the gain change enable control signal is a state after the gain change.

6. The digital proportional integral loop filter of claim 1, wherein the digital proportional integral loop filter comprises a phase error accumulation generator receiving the phase error value to generate a phase error accumulation value, wherein the phase error accumulation generator is shared by the first integral amplification unit, the second integral amplification unit, and the second offset value generation unit.

7. The digital proportional integral loop filter of claim 6, wherein the phase error accumulation generator comprises:

a fifth adder adding the phase error value and an output of a feedback loop; and the feedback loop providing an output of the fifth adder to an input of the fifth adder.

8. The digital proportional integral loop filter of claim 1, further comprising first to third phase error accumulation generators provided in the first integral amplification unit, the second integral amplification unit, and the second offset value generation unit, respectively, to receive the phase error value to generate phase error accumulation values.

* * * * *